United States Patent
Bihani et al.

(10) Patent No.: US 9,497,283 B2
(45) Date of Patent: Nov. 15, 2016

(54) SYSTEM AND METHOD FOR PROVIDING DATA INTEROPERABILITY IN A DISTRIBUTED DATA GRID

(71) Applicant: Oracle International Corporation, Redwood Shores, CA (US)

(72) Inventors: Ballav Bihani, Fremont, CA (US); Robert H. Lee, San Carlos, CA (US); Jason John Howes, Somerville, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 12 days.

(21) Appl. No.: 14/309,600

(22) Filed: Jun. 19, 2014

(65) Prior Publication Data

US 2015/0172405 A1    Jun. 18, 2015

Related U.S. Application Data

(60) Provisional application No. 61/915,923, filed on Dec. 13, 2013.

(51) Int. Cl.
*H04L 29/08* (2006.01)
*H04L 29/06* (2006.01)

(52) U.S. Cl.
CPC ........... *H04L 67/2842* (2013.01); *H04L 67/10* (2013.01); *H04L 67/288* (2013.01)

(58) Field of Classification Search
CPC ....... G06F 9/00; H04L 67/288; H04L 67/10; H04L 67/2842
USPC ........................................................ 709/213
See application file for complete search history.

(56) References Cited

U.S. PATENT DOCUMENTS

| | | | | |
|---|---|---|---|---|
| 2002/0176184 A1* | 11/2002 | Cyrusian | ................ | G11B 27/36 360/31 |
| 2002/0176189 A1* | 11/2002 | Cyrusian | ................ | G11B 5/012 360/46 |
| 2004/0215603 A1* | 10/2004 | Sonkin | .............. | G06F 17/30528 |
| 2007/0260575 A1* | 11/2007 | Robinson | .......... | G06F 17/30348 |
| 2009/0157811 A1* | 6/2009 | Bailor | ............... | G06F 17/30168 709/204 |
| 2012/0173541 A1* | 7/2012 | Venkataramani | ... | G06F 17/3048 707/747 |
| 2012/0198455 A1* | 8/2012 | Lee | ........................ | G06F 9/5061 718/100 |

(Continued)

FOREIGN PATENT DOCUMENTS

| | | | | |
|---|---|---|---|---|
| KR | 20050021751 A | * | 3/2005 | |
| WO | WO 2006055291 A2 | * | 5/2006 | ......... G06F 12/0875 |

OTHER PUBLICATIONS

GemFire Enterprise Architectural Overview Release 5.0, GemStone Systems, Inc., 2006. http://www.gemstone.com/pdf/GemFire_Architecture.pdf.*

*Primary Examiner* — Kostas Katsikis
(74) *Attorney, Agent, or Firm* — Tucker Ellis LLP

(57) ABSTRACT

A system and method can support data interoperability in a distributed data grid. The system can provide an acceptor in the distributed data grid, wherein the acceptor is associated with a cache that is based on the distributed data grid. Furthermore, the acceptor can receive incoming data from a first client, which can be a non-native client that is associated with a client application. Additionally, the system allows a second client, which can be a native client associated with the distributed cache, to share the received incoming data with the first client.

20 Claims, 5 Drawing Sheets

(56) References Cited

U.S. PATENT DOCUMENTS

| | | | |
|---|---|---|---|
| 2012/0246190 A1* | 9/2012 | Surtani | G06F 17/30575 707/769 |
| 2012/0246202 A1* | 9/2012 | Surtani | G06F 17/30607 707/812 |
| 2012/0254436 A1* | 10/2012 | Bihani | G06F 9/54 709/226 |
| 2012/0254543 A1* | 10/2012 | Sintorn | H04L 67/104 711/126 |
| 2012/0297010 A1* | 11/2012 | Zhang | H04L 67/288 709/213 |
| 2012/0331084 A1* | 12/2012 | Chang | H04L 67/2842 709/213 |
| 2013/0031201 A1* | 1/2013 | Kagan | G01D 4/004 709/213 |
| 2013/0339473 A1* | 12/2013 | McCaffrey | H04L 47/62 709/216 |
| 2014/0019497 A1* | 1/2014 | Cidon | G06F 17/30194 707/827 |
| 2014/0019498 A1* | 1/2014 | Cidon | G06F 17/3007 707/827 |
| 2014/0052736 A1* | 2/2014 | Anderson | G06F 17/30607 707/747 |
| 2014/0052744 A1* | 2/2014 | Anderson | G06F 17/30607 707/756 |
| 2014/0059163 A1* | 2/2014 | Herbrich | G06F 17/30348 709/217 |
| 2014/0189034 A1* | 7/2014 | Draznin | H04W 76/023 709/213 |
| 2014/0359044 A1* | 12/2014 | Davis | H04L 45/60 709/213 |
| 2015/0100660 A1* | 4/2015 | Flack | H04L 67/2842 709/213 |
| 2015/0100661 A1* | 4/2015 | Heise | H04L 47/125 709/213 |
| 2015/0100664 A1* | 4/2015 | Flack | H04L 67/28 709/213 |
| 2015/0319182 A1* | 11/2015 | Natarajan | G06F 21/53 726/24 |

* cited by examiner

SYSTEM AND METHOD FOR PROVIDING DATA INTEROPERABILITY IN A DISTRIBUTED DATA GRID

CLAIM OF PRIORITY

This application claims the benefit of priority to U.S. Provisional Patent Application No. 61/915,923, entitled "SYSTEM AND METHOD FOR PROVIDING DATA INTEROPERABILITY IN A DISTRIBUTED DATA GRID" filed Dec. 13, 2013 (Attorney Docket No. ORACL-05468US0), which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support data interoperability in a distributed data grid. The system can provide an acceptor in the distributed data grid, wherein the acceptor is associated with a cache that is based on the distributed data grid. Furthermore, the acceptor can receive incoming data from a first client, which can be a non-native client that is associated with a client application. Additionally, the system allows a second client, which can be a native client associated with the distributed cache, to share the received incoming data with the first client.

DETAILED DESCRIPTION

Figure 1:
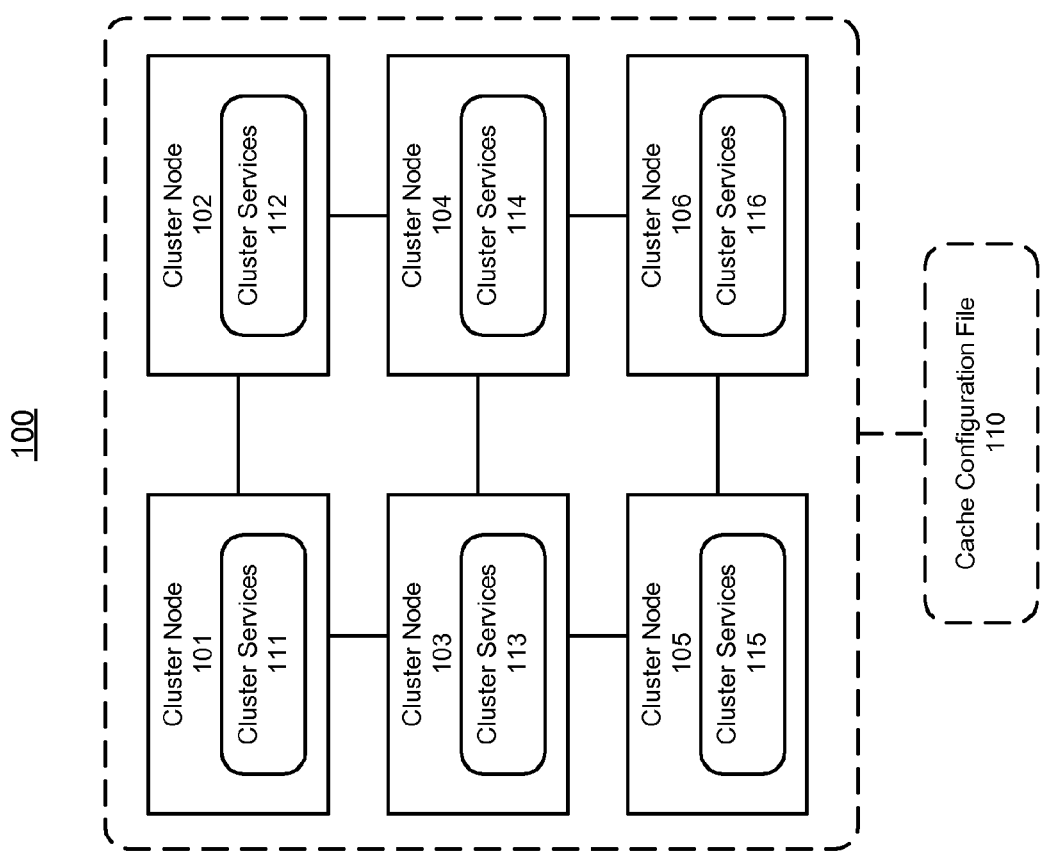
FIG. 1 is an illustration of a data grid cluster in accordance with various embodiments of the invention.

Described herein are systems and methods that can provide data interoperability in a distributed data grid.

Distribute Data Grid

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Data Interoperability

Figure 2:
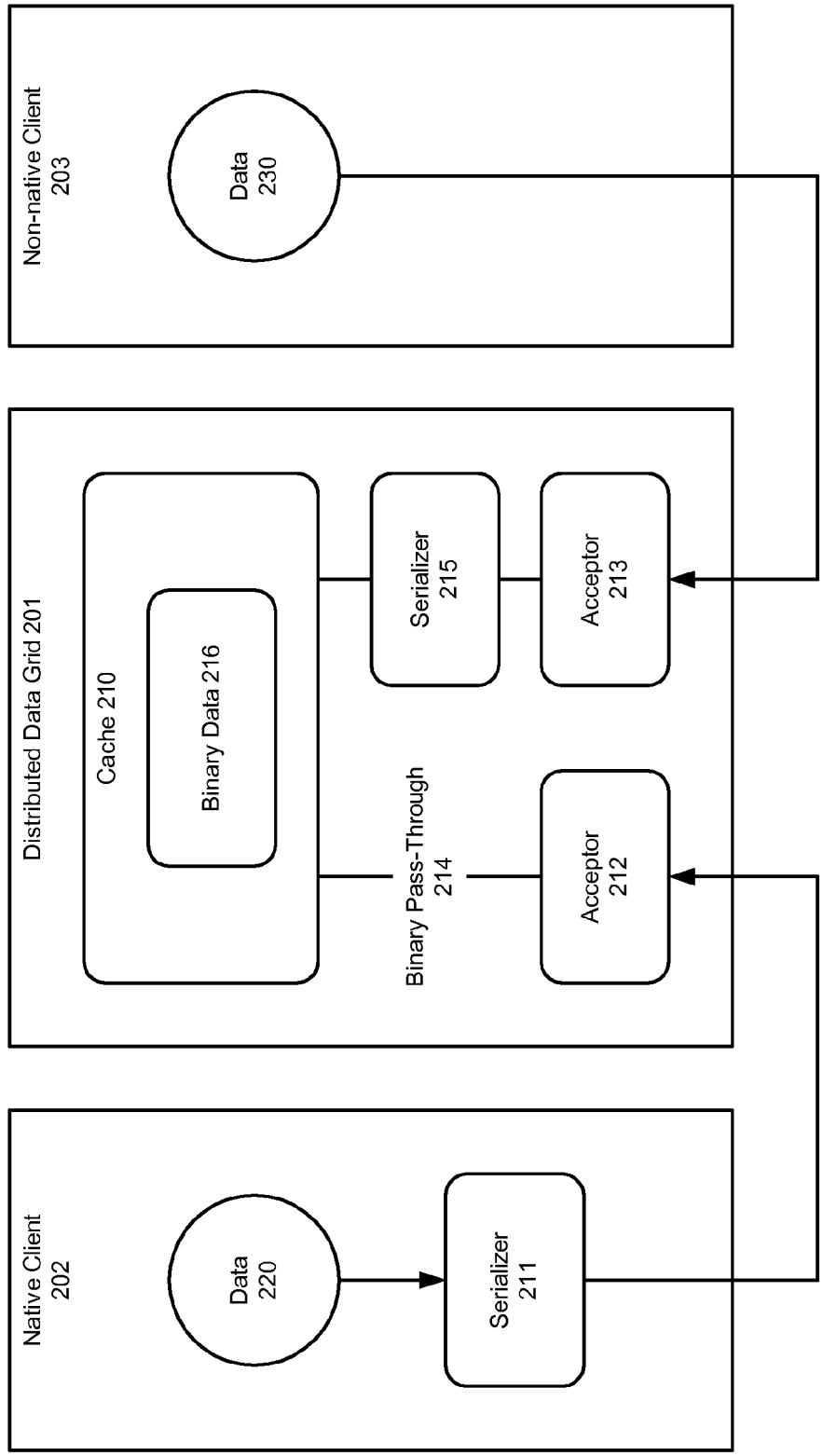
FIG. 2 shows an illustration of providing data interoperability in a distributed data grid, in accordance with an embodiment of the invention.

FIG. 2 shows an illustration of providing data interoperability in a distributed data grid, in accordance with an embodiment of the invention. As shown in FIG. 2, both a native client 202 and a non-native client 203 in a computing environment 200 can access a cache 210 in a distributed data grid 201, e.g. a named cache in a Coherence data grid.

In a Coherence data grid, Both the native client 202 and the non-native client 203 can store data in a named cache. For example, the native client 202 can be a Coherence native client, and the non-native client 203 can be a representational state transfer (REST) client or a memcached client.

In accordance with an embodiment of the invention, the distributed data grid 201 can support data interoperability between the native client 202 and the non-native client 203 based on software object serialization. For example, the system can use a portable object format (POF) to allow the native client 202 and the non-native client 203 to share data (e.g. software objects).

The distributed data grid 201 allows the cache 210 to be configured with an acceptor 212. The native client 202 can use the acceptor 212 (e.g. a TCP acceptor) to access the cache 210 in the distributed data grid 201. Additionally, the acceptor 212 can be configured to run on a proxy server associated with the distributed data grid 201.

Furthermore, the acceptor 212 can support a binary pass-through feature 214. Before the native client 202 sends data 220 to the acceptor 212, the native client 202 can use a serializer 211 (e.g. a POF serializer) to convert the data 220 into binary objects, such as the POF encoded binary objects. Using the binary-pass-through feature 214, the acceptor 212 can store the binary data 216 directly in the distributed cache 210 without a need for wrapping the in-coming binary data from the native client 202 into another binary object.

Additionally, a non-native client 203 in the distributed data grid 201 can share the binary data 216 with the native client 202. As shown in FIG. 2, the distributed data grid 201 can use an acceptor 213 for communicating with the native client 202. Furthermore, the acceptor 213 can use a serializer 215 to convert the data 230 received from the non-native client 203 into a binary format (e.g. POF). Then, the acceptor 213 can store the binary data 216 in the cache 210.

Figure 3:
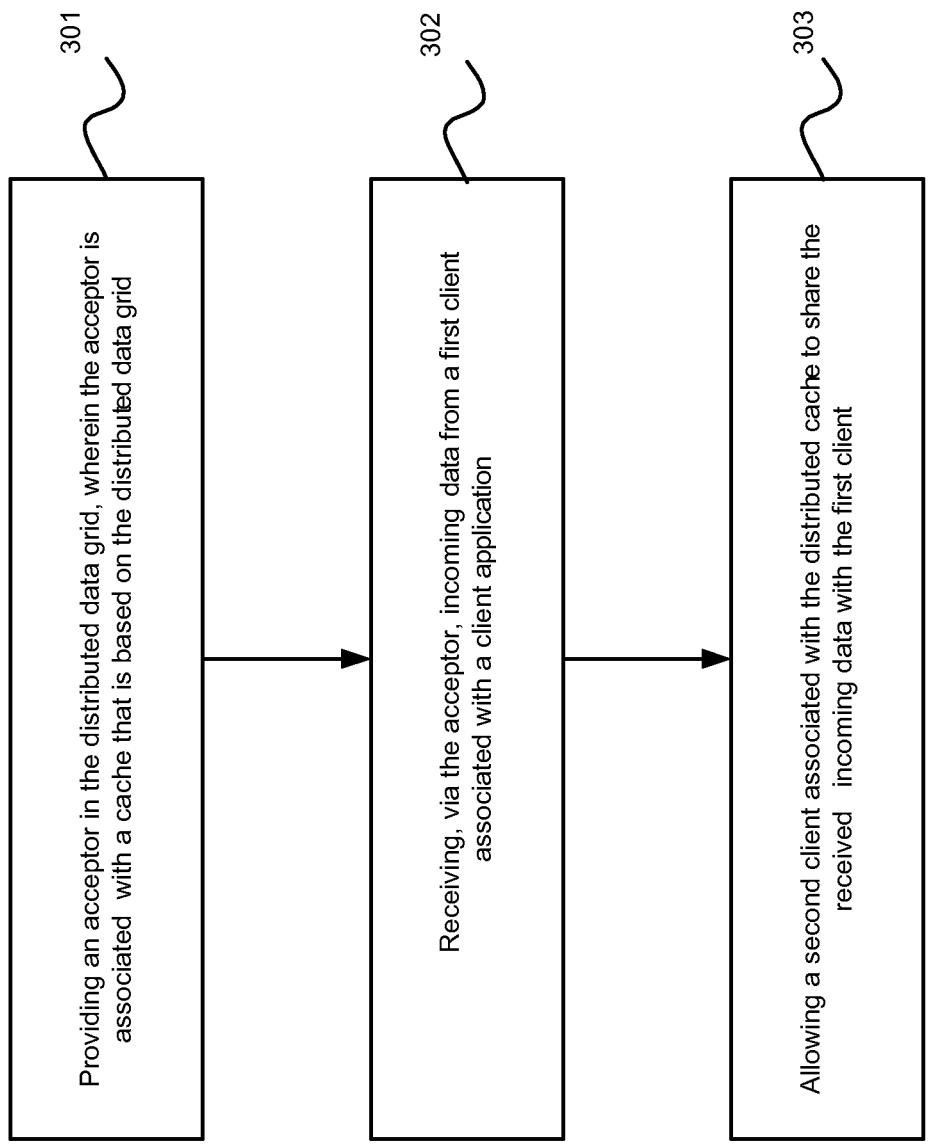
FIG. 3 illustrates an exemplary flow chart for providing data interoperability in a distributed data grid, in accordance with an embodiment of the invention.

FIG. 3 illustrates an exemplary flow chart for providing data interoperability in a distributed data grid, in accordance with an embodiment of the invention. As shown in FIG. 3, at step 301, the system can provide an acceptor in the distributed data grid, wherein the acceptor is associated with a cache that is based on the distributed data grid. Then, at step 302, the acceptor can receive incoming data from a first client associated with a client application. Furthermore, at step 303, the system allows a second client associated with the distributed cache to share the received incoming data with the first client.

Memcached Acceptor

Figure 4:
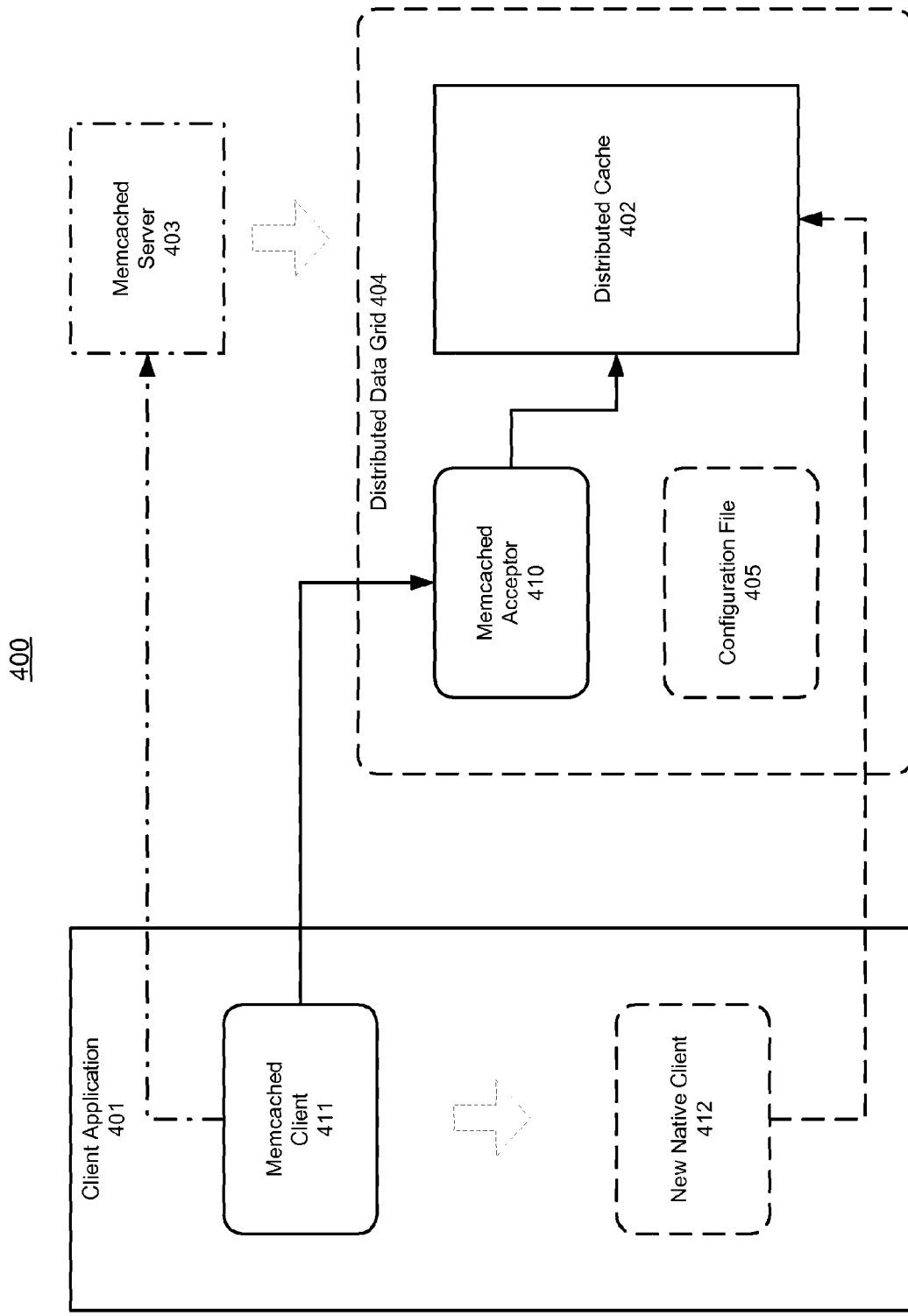
FIG. 4 shows an illustration of providing a memcached acceptor in a distributed data grid, in accordance with an embodiment of the invention.

FIG. 4 shows an illustration of providing a memcached acceptor in a distributed data grid, in accordance with an embodiment of the invention. As shown in FIG. 4, a memcached client 411 in a client application 401 can use a memcached acceptor 410 to access a distributed cache 402 in a distributed data grid 404, such as a named cache in a Coherence data grid.

Furthermore, the memcached client 410 can interact with a memcached server 403, which provides a caching solution in a computing environment 400. The memcached server 403 can be an open source, in-memory key-value store that supports ASCII, binary and other types of protocols.

In accordance with an embodiment of the invention, the memcached acceptor 410 allows the distributed data grid 404 to be a drop-in replacement for the memcached server 403. Using the memcached acceptor 410, the memcached client 411 can easily replace the memcached server 403 with the distributed cache 402 provided by the distributed data gird 404, with no changes required in the client application 401.

Additionally, the memcached acceptor 410 can be used to extend the distributed data grid 404. For example, the memcached acceptor 410 allows the distributed data grid 402 to leverage various (open source) memcached client libraries, which are available in different programming languages including Java, Python, and C/C++.

Thus, using the memcached acceptor 410, the distributed data grid 402 can accept clients, which are implemented using the programming languages that are not supported natively by the distributed data grid 402. For example, the client application 401, which are implemented in the programming languages that are not supported in Coherence (such as python, ruby etc), can use the Coherence data grid for caching purposes. Also, the memcached acceptor 410 can provide multi-language support for a cloud caching service, e.g. the Oracle Public Cloud Caching Service.

In accordance with an embodiment of the invention, the client application 401 can use a native client 412 to replace the memcached client 411, in order to take advantage of the advanced features, which are provided by the distributed data gird 404 and are only available to the native clients.

As shown in FIG. 4, the memcached client 411 may be restricted from using various advance features that are provided by the distributed data grid 404. For example, the memcached client 411 may not use the EntryProcessor feature, which may only be available to the native Coherence clients. Subsequently, the client application 401 can replace the memcached client 411 with the new native client 412, in order to take advantage of these advance features.

Figure 5:
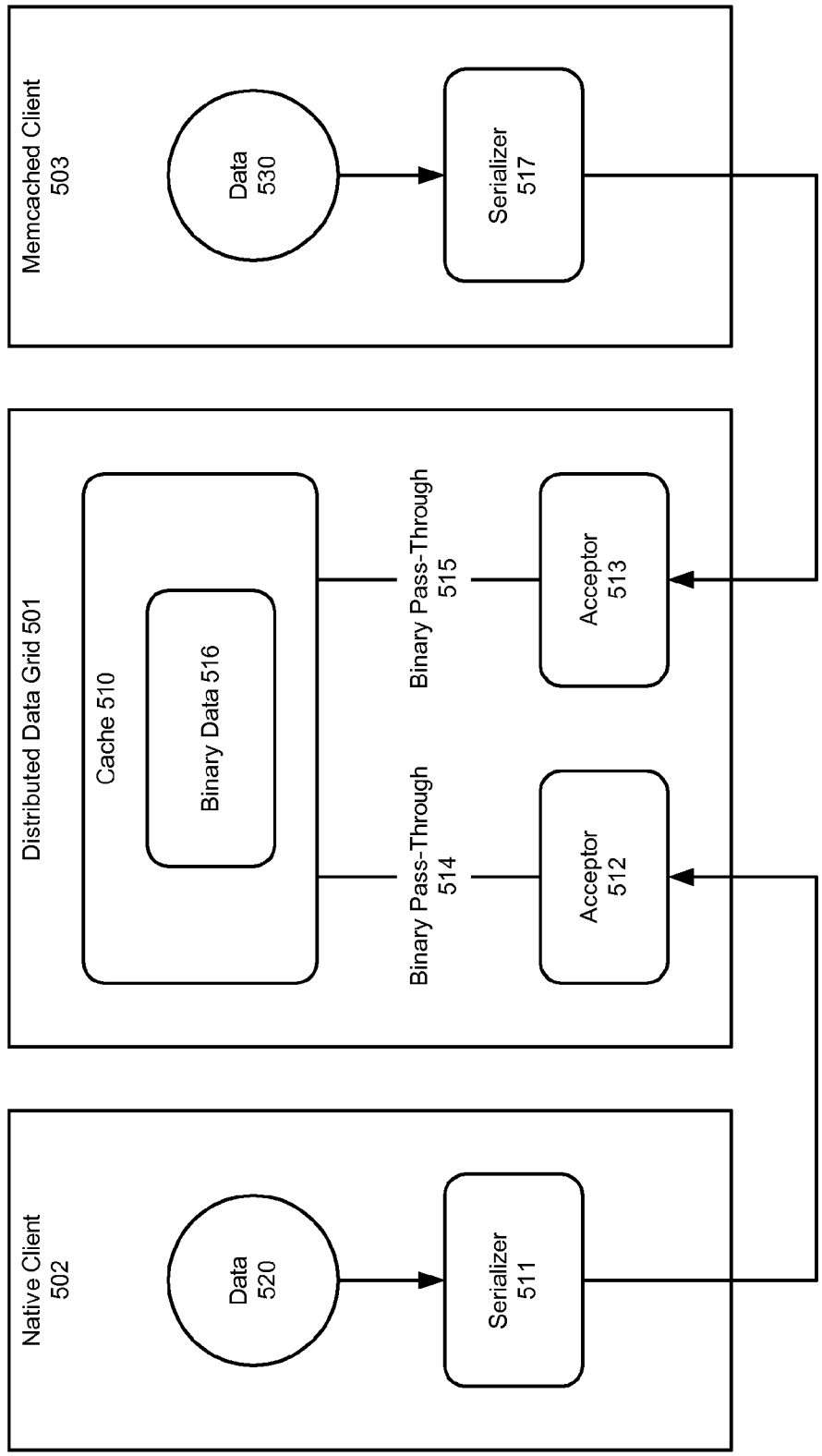
FIG. 5 shows an illustration of supporting binary pass-through for a memcached acceptor in a distributed data grid, in accordance with an embodiment of the invention.

FIG. 5 shows an illustration of supporting binary pass-through for a memcached acceptor in a distributed data grid, in accordance with an embodiment of the invention. As shown in FIG. 5, both a native client 502 and a memcached client 503 in a computing environment 500 can access a cache 510 in a distributed data grid 501, e.g. a named cache in a Coherence data grid.

In accordance with an embodiment of the invention, the distributed data grid 501 can support data interoperability between the native client 502 and the memcached client 503 based on software object serialization.

As shown in FIG. 5, the native client 502 can use the acceptor 512 to access the cache 510 in the distributed data grid 501. Before the native client 502 sends data 520 to the acceptor 512, the native client 502 can use a serializer 511 to convert the data 220 into binary objects, such as the POF encoded binary objects. Using the binary-pass-through feature 514, the acceptor 512 can store the binary data 516 directly in the distributed cache 510.

Additionally, the memcached client 503 in the distributed data grid 501 can share the binary data 516 with the native client 502. As shown in FIG. 5, the distributed data grid 501 allows the cache 510 to be configured with an acceptor 513, which supports a binary pass-through feature 515. Before the memcached client 503 sends data 520 to the acceptor 513, the memcached client 503 can use a serializer 517 (e.g. a pluggable POF serializer) to convert the data 530 into binary objects, such as the POF encoded binary objects. Using the binary-pass-through feature 515, the acceptor 513 can store the binary data 516 directly in the distributed cache 510 without a need for wrapping the in-coming binary data from the memcached client 503 into another binary object.

An Exemplary Memcached Acceptor Implementation

In accordance with an embodiment of the invention, an exemplary memcached acceptor implementation, such as a Coherence memcached adapter, can be used for supporting interoperability between the memcached clients and the Coherence clients based on portable object format (POF).

For example, the Coherence memcached adapter can use the EntryProcessor feature to implement various operations. Additionally, Coherence can store different flag and version information as decorations on the binary entry. Also, the system allows the memcached clients to use pluggable serializers.

Furthermore, the Coherence memcached adaptor can be configured as an acceptor in the proxy service, in a fashion similar to a HTTP acceptor. The following List 1 shows an XML configuration file that is used to configure the Coherence memcached adapter to run on a proxy server associated with the Coherence data grid.

List 1

```
<proxy-scheme>
    <service-name>MemcachedPoFProxyService</service-name>
    <acceptor-config>
        <memcached-acceptor>
            ...
        </memcached-acceptor>
    </acceptor-config>
</proxy-scheme>
```

Additionally, Coherence can enable the memcached adaptor, when the "interop-enabled" flag is set to be "true" in the configuration file. Furthermore, the memcached acceptor can use the SelectionService in Coherence Commons for socket channel input/output (I/O).

The following List 2 shows a XML schema file that defines the property of a memcached acceptor.

List 2

```
<xsd:sequence>
    <xsd:element name="cache-name" type="xsd:string" />
    <xsd:element ref="interop-enabled" minOccurs="0" />
    <xsd:element ref="memcached-auth-method" minOccurs="0" />
    <xsd:element ref="socket-provider" minOccurs="0" />
    <xsd:element ref="address-provider " />
</xsd:sequence>
```

Additionally, the Coherence memcached adaptor can support various authentication mechanisms. For example, the Coherence memcached adaptor can use a Coherence Java authentication and authorization service (JAAS) identity asserter to support the simple authentication and security layer (SASL) PLAIN authentication mechanism. Also, the Coherence memcached adaptor can take advantage of the Coherence proxy security framework for user authorization.

In accordance with an embodiment of the invention, the Coherence memcached adaptor supports a protocol that involves running a command against an item by a memcached client. This item can include any one of the followings:

a. a key (arbitrary string up to 250 bytes in length.),
b. a 32 bit "flag" value,
c. a 64 bit "CAS" value, which is kept unique,
d. arbitrary data, and
e. an expiration time, in seconds.

Furthermore, the memcached client can use various storage commands, such as:

a. the set/add/replace commands,
b. the append/prepend commands, and
c. the incr/decr commands.

Additionally, the memcached client can use various retrieval commands, such as the get/gets commands. Also, the memcached client can use other commands, such as the delete/stat/version/touch/flush commands.

In accordance with an embodiment of the invention, the memcached client can support the simple authentication and security layer (SASL), which is a framework for authentication. Moreover, the memcached client can use different serialization formats, since the memcached binary protocol may not specify a serialization format.

The following List 3 shows a memcached client that can use the Coherence memcached adaptor.

List 3

```
import bmemcached
client = bmemcached.Client(('127.0.0.1:11211', ))
client.set("string key","string value")
print client.get("string key")
client.set("int key",100)
client.incr("int key", 10)
print client.get("int key")
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented method for supporting data interoperability in a distributed data grid including a plurality of networked computers each having a microprocessor and memory, said computer-implemented method comprising:
   providing a first acceptor operating in the distributed data grid, wherein the first acceptor is associated with a distributed cache in the memory of the plurality of networked computers of the distributed data grid;
   providing a binary pass-through associated with said first acceptor;
   receiving, via the first acceptor, incoming data from a first client associated with a first client application, wherein the first client utilizes a first serializer to convert software objects into a binary format such that said incoming data received by said first acceptor is in said binary format;
   using the binary pass-through to store said first incoming data received by said first acceptor in said binary format in the distributed cache;
   providing a second acceptor operating on a computer in the distributed data grid, wherein the second acceptor is associated with the distributed cache;
   providing a second serializer associated with said second acceptor;
   receiving, via the second acceptor, second incoming data from a second client associated with a second client application different than the first application;
   using the second serializer to convert said second incoming data received by the second acceptor into the binary format, and storing said second incoming data in said binary format in the distributed cache; and
   supporting data interoperability by allowing each of the first client and the second client to access the first incoming data stored in said binary format in the distributed cache and the second incoming data stored in said binary format in the distributed cache.

2. The computer-implemented method according to claim 1, wherein:
   allowing the first client is a native client that is associated with a non-native server, and
   the second client is a non-native client of the distributed data grid.

3. The computer-implemented method according to claim 2, further comprising:
   allowing the second client application to replace the non-native client with another native client.

4. The computer-implemented method according to claim 2, wherein:
   the non-native client is one of
      a memcached client, and
      a representational state transfer (REST) client.

5. The computer-implemented method according to claim 1, wherein:
   the second client is implemented using a programming language that is not supported by the distributed data grid.

6. The computer-implemented method according to claim 1, wherein:
   the binary format is a portable object format (POF).

7. The computer-implemented method according to claim 1, wherein:
   the second client is a memcached client and the second acceptor is a memcached acceptor.

8. The computer-implemented method according to claim 1, further comprising:
   providing a plurality of pluggable acceptors in the distributed data grid, wherein each of said plurality of pluggable acceptors operates to use a serializer to convert incoming data received from another client into the binary format.

9. The computer-implemented method according to claim 1, further comprising:
   configuring the second acceptor as a proxy service that is provided by the distributed data grid.

10. The computer-implemented method according to claim 9, further comprising:
    configuring the second acceptor in a configuration file that is associated with the distributed data grid.

11. A system for supporting data interoperability, said system comprising:
    a distributed data grid comprising a plurality of networked computers each having a microprocessor and memory;
    a first acceptor operating on a computer of the plurality of networked computers, wherein the first acceptor is associated with a binary pass-through and a distributed cache in the memory of the plurality of networked computers of the distributed data grid;
    wherein the first acceptor is configured to receive first incoming data from a first client associated with a first client application, wherein the first client utilizes a first serializer to convert software objects into a binary format such that said first incoming data received by said first acceptor is in said binary format and use the binary pass-through to store said first incoming data in said distributed cache;
    a second acceptor operating on the computer, wherein the second acceptor is associated with a second serializer and the distributed cache in the memory of the distributed data grid;
    wherein the second acceptor is configured to receive second incoming data from a second client associated with a second client application different than the first application, and use the second serializer to convert said second incoming data received by the second acceptor into the binary format, and store said second incoming data in said binary format in said distributed cache; and
    whereby the system is configured to support data interoperability by allowing each of the first client and the second client to access the first incoming data stored in said binary format in the distributed cache and the second incoming data stored in said binary format in the distributed cache.

12. The system of claim 11, wherein the first client is a native client that is associated with a native server, and the second client is a non-native client.

13. The system of claim 11, wherein:
    the first client is a native client that is associated with a native server, and the second client is a non-native client; and.
    the non-native client is one of a memcached client, and a representational state transfer (REST) client.

14. The system of claim 11, wherein:
    the second client is implemented using a programming language that is not supported by the distributed data grid.

15. The system of claim 11, wherein:
    the binary format is a portable object format (POF).

16. The system of claim 11, wherein:
the second client is a memcached client and the second acceptor is a memcached acceptor.

17. The system of claim 11, further comprising:
a plurality of pluggable acceptors, wherein each of said plurality of pluggable acceptors operates to use a serializer to convert incoming data received from another client into the binary format.

18. The system of claim 11, wherein:
the second acceptor is configured as a proxy service that is provided by the distributed data grid to the second client.

19. The system of claim 11, further comprising:
a configuration file which configures the second acceptor.

20. A non-transitory computer-readable medium including instructions stored thereon for supporting data interoperability in a distributed data grid comprising a plurality of networked computers each having a microprocessor and memory, which instructions, when executed cause said distributed data grid to perform steps comprising:

providing a first acceptor operating in the distributed data grid, wherein the first acceptor is associated with a distributed cache in the memory of the plurality of networked computers of the distributed data grid;

providing a binary pass-through associated with said first acceptor;

receiving, via the first acceptor, incoming data from a first client associated with a first client application, wherein the first client utilizes a first serializer to convert software objects into a binary format such that said incoming data received by said first acceptor is in said binary format;

using the binary pass-through to store said first incoming data received by said first acceptor in said binary format in the distributed cache;

providing a second acceptor operating on a computer in the distributed data grid, wherein the second acceptor is associated with the distributed cache;

providing a second serializer associated with said second acceptor;

receiving, via the second acceptor, second incoming data from a second client associated with a second client application different than the first application;

using the second serializer to convert said second incoming data received by the second acceptor into the binary format, and storing said second incoming data in said binary format in the distributed cache; and supporting data interoperability by allowing each of the first client and the second client to access the first incoming data stored in said binary format in the distributed cache and the second incoming data stored in said binary format in the distributed cache.

* * * * *